(12) United States Patent
Martinson

(10) Patent No.: US 7,780,299 B2
(45) Date of Patent: Aug. 24, 2010

(54) LATERAL-VIEW MIRROR ASSEMBLY FOR A VEHICLE

(76) Inventor: Lowell Martinson, 16455 S. 15th St., Phoenix, AZ (US) 85048

( * ) Notice: Subject to any disclaimer, the term of this patent is extended or adjusted under 35 U.S.C. 154(b) by 398 days.

(21) Appl. No.: 11/777,891

(22) Filed: Jul. 13, 2007

(65) Prior Publication Data

US 2009/0015950 A1    Jan. 15, 2009

(51) Int. Cl.
*G02B 7/18* (2006.01)
(52) U.S. Cl. ..................................... 359/843
(58) Field of Classification Search ............... 359/841, 359/844, 871, 872
See application file for complete search history.

(56) References Cited

U.S. PATENT DOCUMENTS 5,424,875 A * 6/1995 Davis, II ................ 359/872
6,104,538 A * 8/2000 Ben-Ghiath ............. 359/630
7,137,716 B2 * 11/2006 Bogard et al. ............ 359/855
7,422,337 B1 * 9/2008 Fetherston .............. 359/855

* cited by examiner

*Primary Examiner*—Euncha P Cherry
(74) *Attorney, Agent, or Firm*—Schmeiser, Olsen & Watts, LLP

(57) ABSTRACT

A lateral-view mirror assembly comprising a housing having a first lateral-view mirror and a second lateral-view mirror coupled to a rear window of a vehicle and dimensioned to provide a driver of a vehicle with the ability to view objects positioned lateral to a rear portion of the vehicle by looking at a reflection of the objects reflected from the first and second lateral-view mirrors to the rear-view mirror to the driver. The lateral-view mirror assembly is helpful when backing out of a parking space and also when changing lanes.

17 Claims, 5 Drawing Sheets

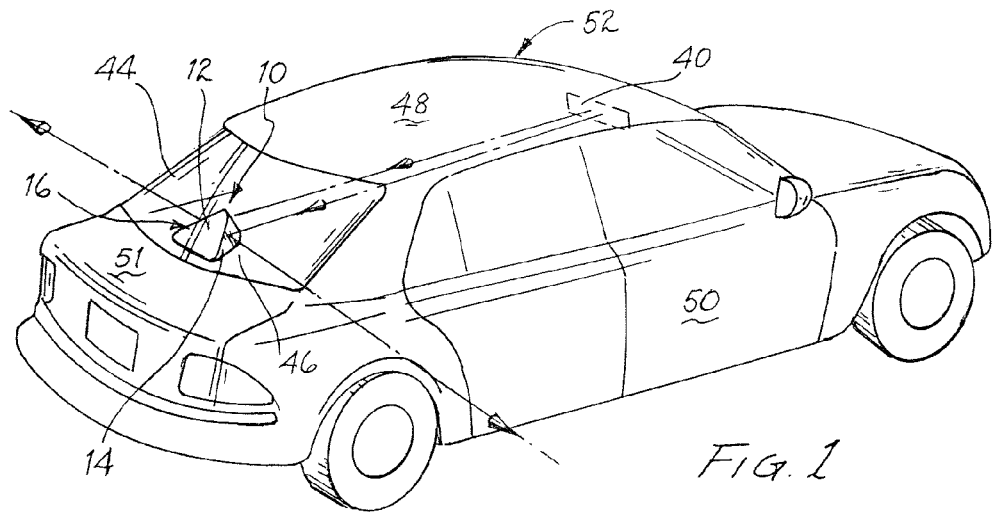
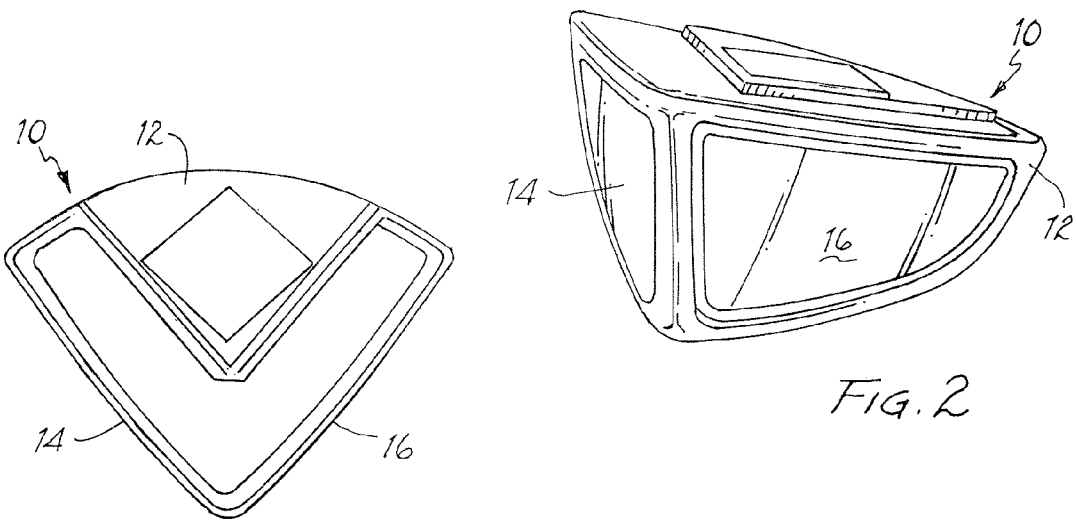
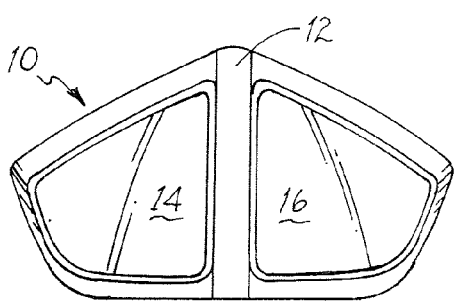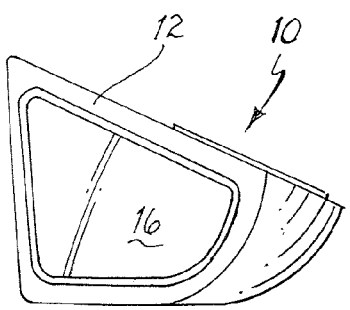

LATERAL-VIEW MIRROR ASSEMBLY FOR A VEHICLE

FIELD OF THE INVENTION

This invention relates generally to mirrors for vehicles designed to aid a driver in identifying objects and, more specifically, to a lateral-view mirror assembly coupled to the rear window of a vehicle and dimensioned to allow a driver to view objects positioned lateral to a rear portion of the vehicle.

BACKGROUND OF THE INVENTION

Driving a car or other vehicle safely requires the driver to constantly be able to see other vehicles, objects and pedestrians. This is often difficult since a car has many blind-spots, and the driver generally is facing forward with limited ability to turn around and view surrounding areas. One situation where a driver's limited field of vision presents an especially acute problem is when pulling out of a parking spot. When a driver needs to back out of a parking space in which he or she is parked face-forward between two other vehicles, especially when those vehicles are large in size, the driver has no ability to see laterally to either side of the rear portion of his or her vehicle to determine if there are pedestrians or other vehicles about to cross into his or her path. Often, most drivers in this situation simply back out slowly in an attempt to alert pedestrians and other cars of the vehicle's presence. This method is fraught with danger. It is often the case that pedestrians walking through a parking lot simply do not see a car as it backs out. The same is the case for another vehicle or a bike which might be passing quickly behind the driver's vehicle as he or she backs out. In all of these cases, it is the parked vehicle's driver who is responsible for insuring that his or her car does not strike a pedestrian or vehicle. In order to be sure that a pedestrian or vehicle is not approaching, the driver must be able to see laterally from a rear portion of the driver's vehicle.

Positioning a lateral-view mirror on a top surface of a rear portion of a vehicle is one way to assist a driver to be able to see objects positioned lateral to a rear end of a vehicle. However, some drivers may not prefer, for aesthetic reasons, to place a lateral view mirror on a top surface of a rear portion of a vehicle.

Thus, a need existed for a lateral-view mirror assembly coupled to a rear window of a vehicle, and in a line of sight with a car's rear-view mirror, and dimensioned to allow a driver to view people, vehicles, and other objects positioned lateral to a rear portion of the vehicle.

SUMMARY OF THE INVENTION

An object of the present invention is to provide a lateral-view mirror assembly for a vehicle capable of providing a driver with the ability to view objects positioned lateral to a rear portion of the vehicle by looking at a reflection of the objects reflected from lateral-view mirrors coupled to a rear window of a vehicle and positioned in a line of sight with the rear-view mirror.

Another object of the present invention is to provide a lateral-view mirror assembly for a vehicle that is adjustable and programmable with preset mirror positions for specific drivers' preferences.

Another object of the present invention is to provide a lateral-view mirror assembly for a vehicle that is adjustable and programmable with preset mirror positions for varying types of parking spaces.

BRIEF DESCRIPTION OF THE PREFERRED EMBODIMENTS

In accordance with one embodiment of the present invention, a lateral-view mirror assembly for a vehicle is disclosed. The lateral-view mirror assembly comprises, in combination: a housing coupled to a rear window of the vehicle; a first lateral-view mirror coupled to the housing, the first lateral-view mirror being positioned in a line of sight with a rear-view mirror of the vehicle, the first lateral-view mirror being dimensioned to allow a driver to view objects positioned lateral to a passenger's side of a rear portion of the vehicle by looking at a reflection of the objects reflected from the first lateral-view mirror to the rear-view mirror to the driver; and a second lateral-view mirror coupled to the housing, the second lateral-view mirror being positioned in a line of sight with the rear-view mirror of the vehicle, the second lateral-view mirror being dimensioned to allow the driver to view objects positioned lateral to a driver's side of the rear portion of the vehicle by looking at a reflection of the objects reflected from the second lateral-view mirror to the rear-view mirror to the driver.

In accordance with another embodiment of the present invention, a lateral-view mirror assembly for a vehicle is disclosed. The lateral-view mirror assembly comprises, in combination: a housing coupled to a substantially center portion of an interior surface of a rear window of the vehicle; a first lateral-view mirror coupled to the housing, the first lateral-view mirror being positioned in a line of sight with a rear-view mirror of the vehicle, the first lateral-view mirror being dimensioned to allow a driver to view objects positioned lateral to a passenger's side of a rear portion of the vehicle by looking at a reflection of the objects reflected from the first lateral-view mirror to the rear-view mirror to the driver; and a second lateral-view mirror coupled to the housing, the second lateral-view mirror being positioned in a line of sight with the rear-view mirror of the vehicle, the second lateral-view mirror being dimensioned to allow the driver to view objects positioned lateral to the driver's side of the rear portion of the vehicle by looking at a reflection of the objects reflected from the second lateral-view mirror to the rear-view mirror to the driver.

In accordance with yet another embodiment of the present invention, a method for viewing objects positioned lateral to a rear portion of a vehicle is disclosed. The method comprises the steps of providing a housing having: a first lateral-view mirror coupled to the housing, the first lateral-view mirror being positioned in a line of sight with a rear-view mirror of the vehicle, the first lateral-view mirror being dimensioned to allow a driver to view objects positioned lateral to a passenger's side of the rear portion of the vehicle by looking at a reflection of the objects reflected from the first lateral-view mirror to the rear-view mirror to the driver; and a second lateral-view mirror coupled to the housing, the second lateral-view mirror being positioned in a line of sight with the rear-view mirror of the vehicle, the second lateral-view mirror being dimensioned to allow the driver to view objects positioned lateral to a driver's side of the rear portion of the vehicle by looking at a reflection of the objects reflected from the second lateral-view mirror to the rear-view mirror to the driver; coupling the housing to a substantially center portion of an interior surface of a rear window of the vehicle; and the driver looking into the rear-view mirror so as to view objects positioned lateral to the rear portion of the vehicle.

The foregoing and other objects, features, and advantages of the invention will be apparent from the following, more particular description of the preferred embodiments of the invention, as illustrated in the accompanying drawings.

BRIEF DESCRIPTION OF THE DRAWINGS

FIG. 1 is a perspective view of an embodiment of the lateral-view mirror assembly of the present invention, showing the line of sight between the rear view mirror and the lateral-view mirror assembly.

FIG. 2 is a perspective view of an embodiment of the lateral-view mirror assembly of the present invention.

FIG. 3 is a bottom view of the lateral-view mirror assembly of FIG. 2.

FIG. 4 is a front view of the lateral-view mirror assembly of FIG. 2.

FIG. 5 is a side view of the lateral-view mirror assembly of FIG. 2.

DETAILED DESCRIPTION OF THE PREFERRED EMBODIMENTS

Figure 6:
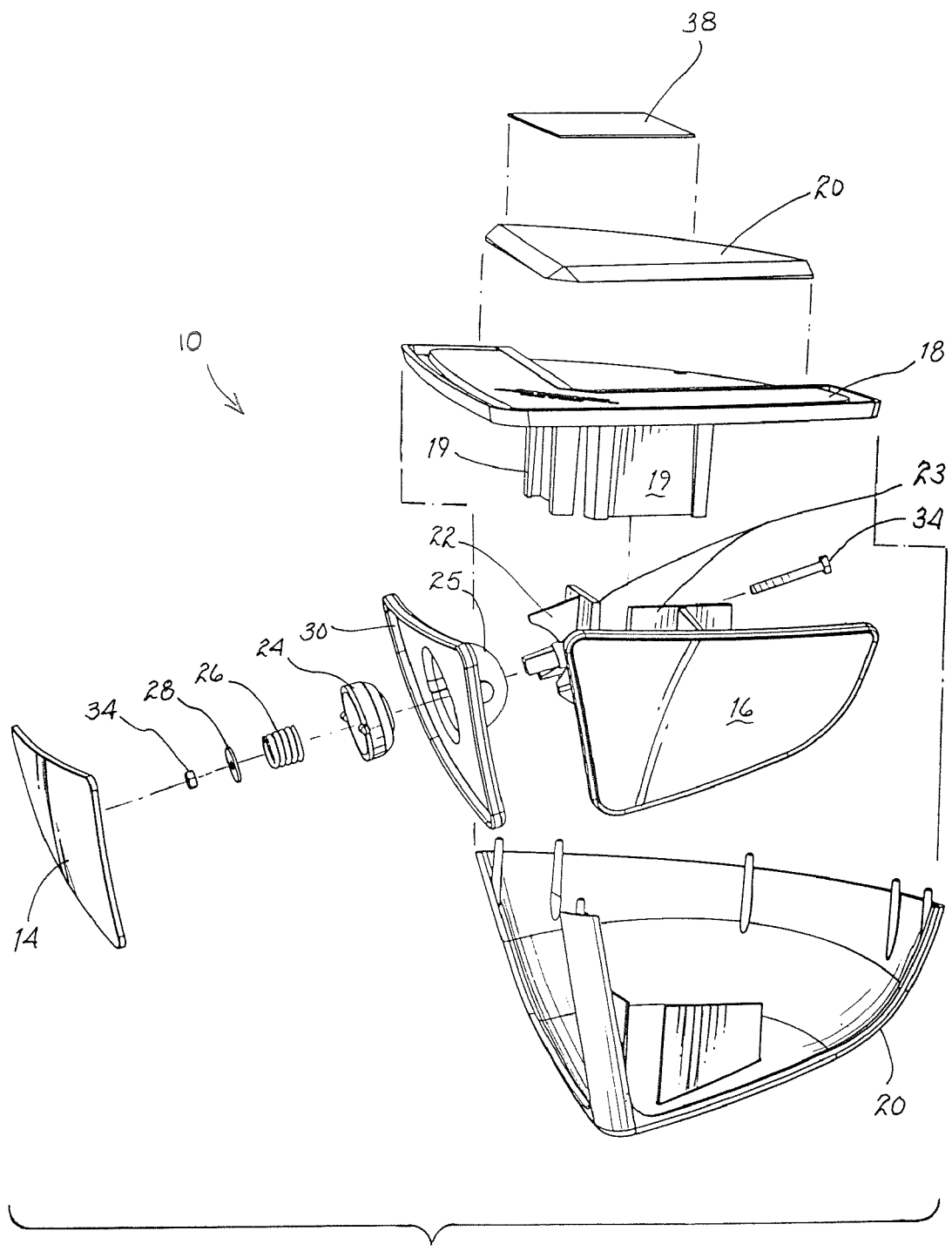
FIG. 6 is an exploded perspective view of the lateral-view mirror assembly of FIG. 2.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

FIGS. 1-11 show a lateral-view mirror assembly, hereinafter lateral-view mirror assembly 10. The lateral-view mirror assembly 10 comprises a housing 12, a first lateral-view mirror 14, and a second lateral-view mirror 16. The housing 12 is preferably coupled to a center portion 46 of an inner surface of a rear window 44 of a vehicle 48.

In FIG. 1, a lateral-view mirror assembly 10 is shown in a vehicle 48. The housing 12 is shown coupled to a center portion 46 of the inner surface of the rear window 44 of the vehicle 48. The first lateral-view mirror 14 is coupled to the housing 12 and is positioned in line of sight with the rear-view mirror 40. The first lateral-view mirror 14 is dimensioned to allow a driver 42 (see FIG. 8) to view objects 54 (see FIG. 7) positioned lateral to a passenger's side 50 of a rear portion 51 of the vehicle 48 by reflecting the objects 54 from the first lateral-view mirror 14 to the rear-view mirror 40 to the driver 42.

The second lateral-view mirror 16 is also coupled to the housing 12 and is positioned in light of sight with the rear-view mirror 40. The second lateral-view mirror 16 is dimensioned to allow the driver 42 to view objects 56 (see FIG. 7) positioned lateral to a driver's side 52 of the rear portion 51 of the vehicle 48 by reflecting the objects 56 from the second lateral-view mirror 16 to the rear-view mirror 40 to the driver 42.

FIGS. 2-6 show the first lateral-view mirror 14 and the second lateral-view mirror 16 coupled to the housing 12. In FIG. 6, the housing 12 has a base 18 and a top 20. The first lateral-view mirror 14 and the second lateral-view mirror 16 are each coupled to a mirror holder 30. Each mirror holder 30 preferably has a dome-shaped surface 25 that engages a bracket 22 and is coupled to the bracket 22 by a hex screw 32, a dome washer 24, a spring 26, a flat washer 28, and a hex nut 34. Preferably, the bracket 22 defines flat edges 23 that are slidably coupled to corresponding grooves 19 defined by a top portion of the base 18. Preferably a mounting plate 36 is coupled to a bottom portion of the base 18 and an adhesive 38 is coupled to a bottom portion of the mounting plate 36. The adhesive 38 is used to mount the lateral-view mirror assembly 10 to the rear window 44 of the vehicle 48. It should be clearly understood, however, that substantial benefit may be derived from the first lateral-view mirror 14 and the second lateral-view mirror 16 being coupled to the housing 12 in an alternative manner so long as they are adjustable and allow the driver 42 to view objects positioned lateral to the rear portion 51 of the vehicle 48. It should also be clearly understood that substantial benefit may be derived from the lateral-view mirror assembly 10 being coupled to the rear window 44 by means other than adhesive or by the lateral-view mirror assembly 10 being integral to the rear window 44.

Figure 7:
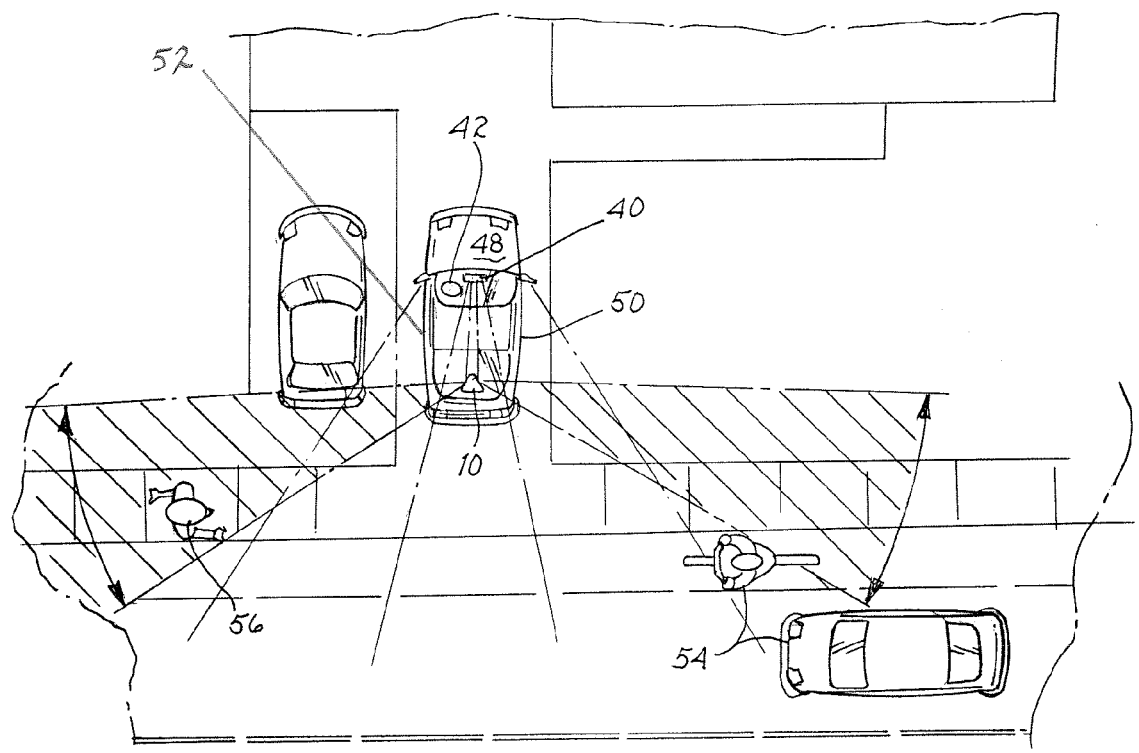
FIG. 7 is a top view of a vehicle using the lateral-view mirror assembly of FIG. 1 to view pedestrians and another vehicle while backing out of a straight parking space.
Figure 8:
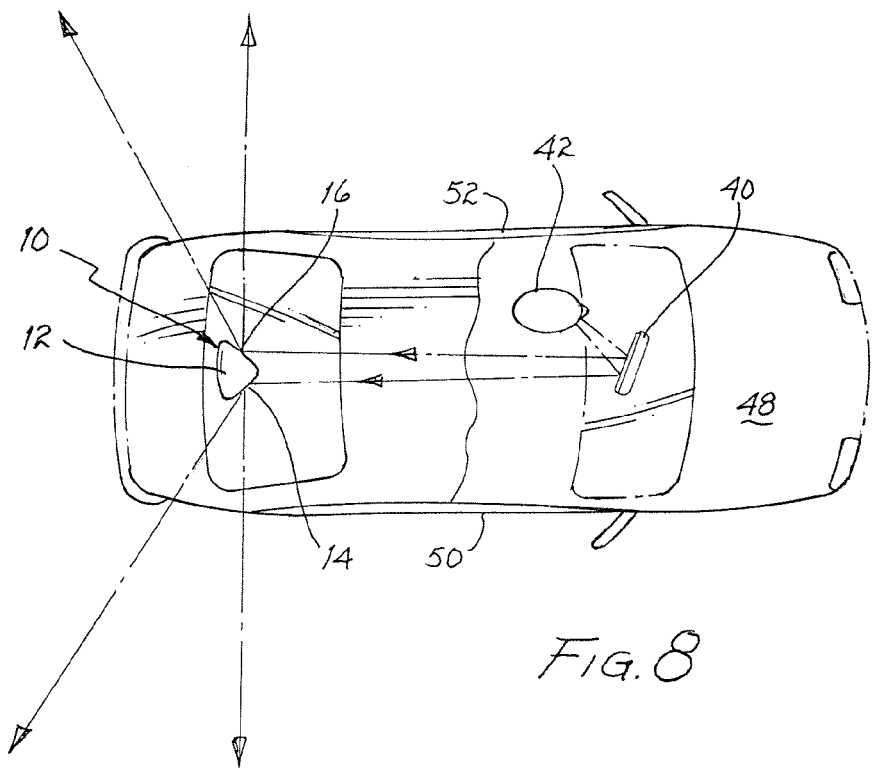
FIG. 8 is a top view of a vehicle using the lateral-view mirror assembly of FIG. 1, showing a driver using the line of sight between the rear view mirror and the lateral-view mirror assembly.

FIG. 7 and FIG. 8 show the lateral-view mirror assembly 10 in use with a vehicle 48. The first lateral-view mirror 14 allows the driver 42 to view objects 54 positioned lateral to the passenger's side 50 of a rear portion 51 of the vehicle 48 by reflecting the objects 54 from the first lateral-view mirror 14 to the rear-view mirror 40 to the driver 42. The second lateral-view mirror 16 allows the driver 42 to view objects 56 positioned lateral to the driver's side 52 of the rear portion 51 of the vehicle 48 by reflecting the objects 56 from the second lateral-view mirror 16 to the rear-view mirror 40 to the driver 42.

Preferably, the lateral-view mirror assembly 10 will be adjustable and will have a remote controlled system comprising a remote control proximate the driver's side 52 of the vehicle 48 and at least one actuation device coupled to the housing 12 for adjusting the first lateral-view mirror 14 and the second lateral-view mirror 16 relative to the rear portion 40 of the vehicle 48 when the remote control transmits an actuation signal to the at least one actuation device. Further preferably, the remote controlled system will be programmable with at least one preset position for the first lateral-view mirror 14 and/or the second lateral-view mirror 16. The remote controlled system may be programmed according to a specific driver's preferences and/or may be programmed according to the type of parking space that a driver 42 is pulling out of, i.e. straight (as shown in FIG. 7), angled, or parallel parking. It should be clearly understood, however, that substantial benefit may be derived from the lateral-view mirrors 14, 16 being manually adjustable.

Figure 9:
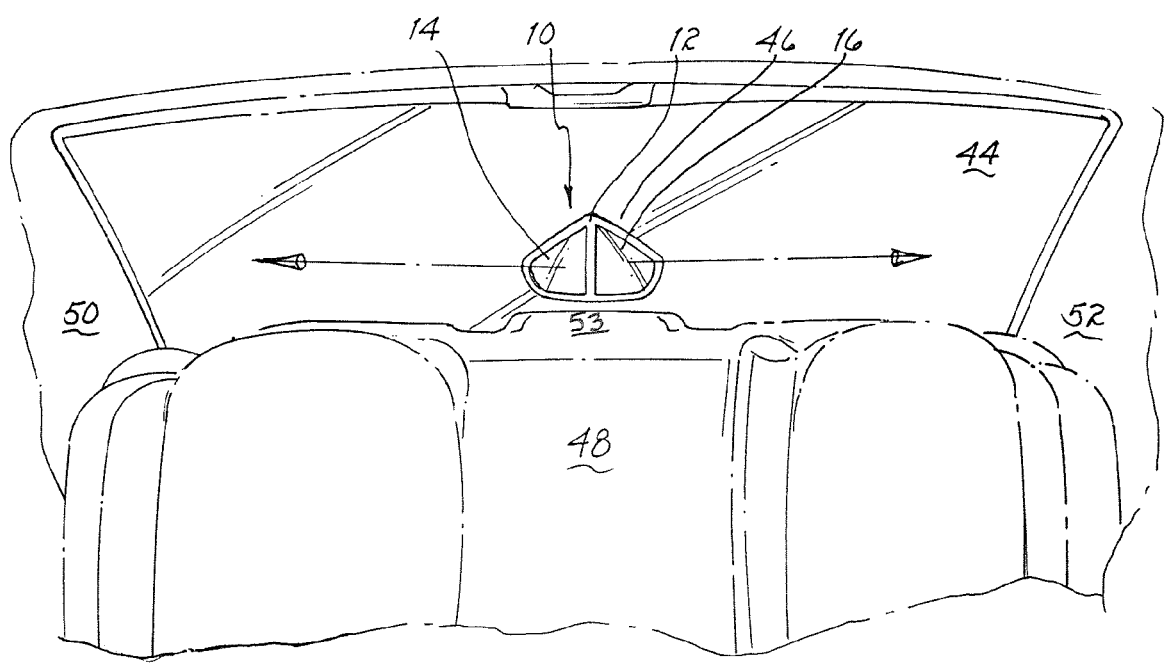
FIG. 9 is a front view of the lateral-view mirror assembly of FIG. 2, shown coupled to a center portion of an interior surface of the rear window of a vehicle.

FIG. 9 shows the lateral-view mirror assembly 10 coupled to a center portion 46 of an interior surface of the rear window 44 of the vehicle 48. The lateral-view mirror assembly 10 is shown coupled just above the brake light 53, however, it should be clearly understood that substantial benefit may be derived from the brake light 53 being integral to the lateral-view mirror assembly 10.

Figure 10:
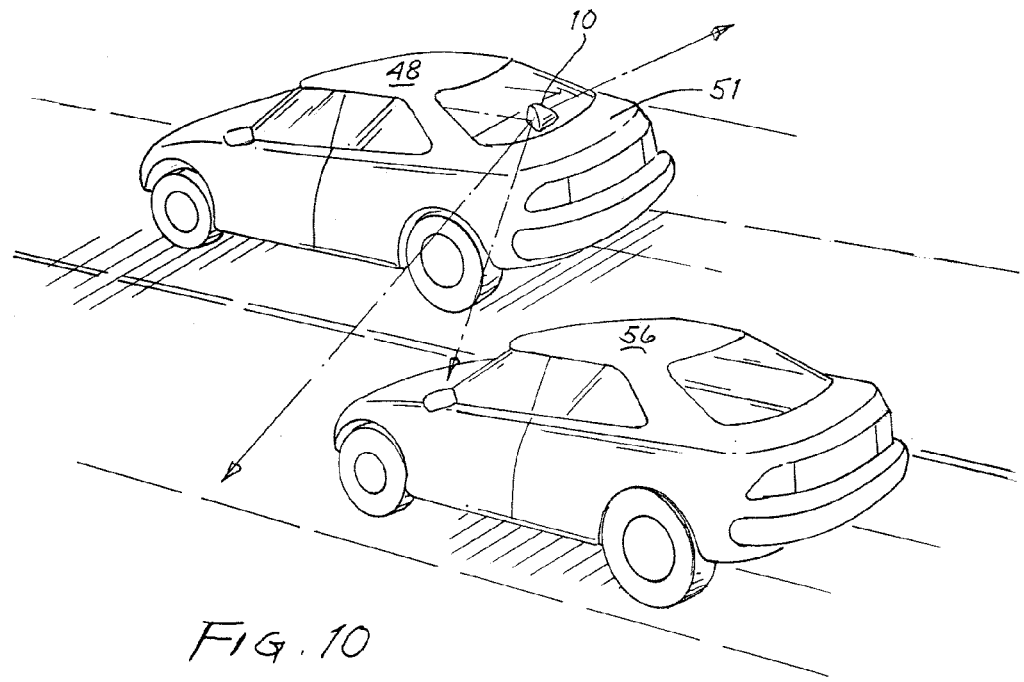
FIG. 10 is a perspective view of the lateral-view mirror assembly of FIG. 1 being used while changing lanes.
Figure 11:
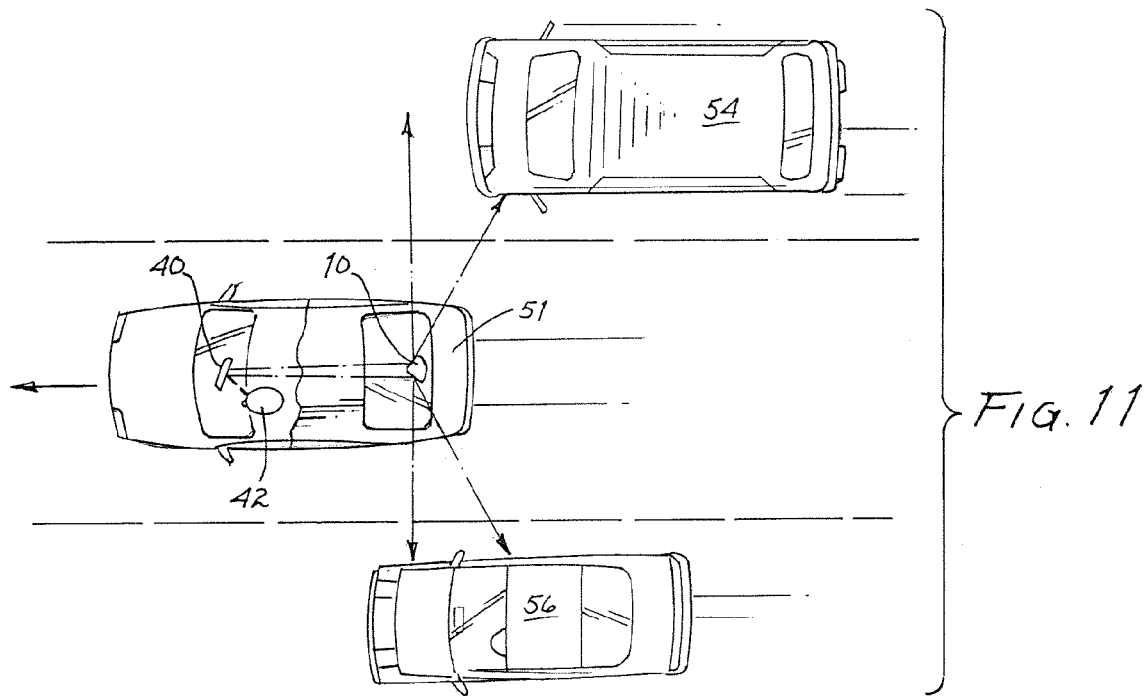
FIG. 11 is a top view of the lateral-view mirror assembly of FIG. 1 being used while changing lanes.

FIGS. 10 and 11 show the lateral-view mirror assembly 10 coupled to a center portion 46 of the interior surface of the rear window 44 of the vehicle 48. The lateral view mirror assembly 10 is shown being used by a driver 42 to view cars lateral to the rear portion 51 of the vehicle 48. This is especially helpful when the driver 42 is changing lanes.

While the invention has been particularly shown and described with reference to preferred embodiments thereof, it will be understood by those skilled in the art that the foregoing and other changes in form and details may be made therein without departing from the spirit and scope of the invention.

I claim:

1. A lateral-view mirror assembly for a vehicle comprising, in combination:
   a housing coupled to a rear window of said vehicle, said housing comprising:
   a base;
   a first and a second bracket slidingly coupled to said base;
   a first mirror holder coupled to said first bracket; and
   a second mirror holder coupled to said second bracket;
   a first lateral-view mirror coupled to said first mirror holder, said first lateral-view mirror being positioned in a line of sight with a rear-view mirror of said vehicle, said first lateral-view mirror being dimensioned to allow a driver to view objects positioned lateral to a passenger's side of a rear portion of said vehicle by looking at a reflection of said objects reflected from said first lateral-view mirror to said rear-view mirror to said driver; and
   a second lateral-view mirror coupled to said second mirror holder, said second lateral-view mirror being positioned in a line of sight with said rear-view mirror of said vehicle, said second lateral-view mirror being dimensioned to allow said driver to view objects positioned lateral to a driver's side of said rear portion of said vehicle by looking at a reflection of said objects reflected from said second lateral-view mirror to said rear-view mirror to said driver.

2. The assembly of claim 1 wherein said housing is coupled to a substantially center portion of an interior surface of said rear window of said vehicle.

3. The assembly of claim 2 wherein said housing is coupled to said rear window of said vehicle by adhesive.

4. The assembly of claim 2 wherein said housing being integral to said rear window of said vehicle.

5. The assembly of claim 1 further comprising a remote controlled system coupled to said vehicle and having:
   a remote control coupled to an interior portion of said vehicle proximate said driver's side of said vehicle; and
   at least one actuation device coupled to said housing for adjusting said first lateral-view mirror and said second lateral-view mirror relative to said rear portion of said vehicle when said remote control transmits an actuation signal to said at least one actuation device.

6. The assembly of claim 5 wherein said remote controlled system being programmable with at least one preset position for at least one of said first lateral-view mirror and said second lateral-view mirror.

7. A lateral-view mirror assembly for a vehicle comprising, in combination:
   a housing coupled to a substantially center portion of an interior surface of a rear window of said vehicle;
   a first lateral-view mirror coupled to said housing, said first lateral-view mirror being positioned in a line of sight with a rear-view mirror of said vehicle, said first lateral-view mirror being dimensioned to allow a driver to view objects positioned lateral to a passenger's side of a rear portion of said vehicle by looking at a reflection of said objects reflected from said first lateral-view mirror to said rear-view mirror to said driver; and
   a second lateral-view mirror coupled to said housing, said second lateral-view mirror being positioned in a line of sight with said rear-view mirror of said vehicle, said second lateral-view mirror being dimensioned to allow said driver to view objects positioned lateral to said driver's side of said rear portion of said vehicle by looking at a reflection of said objects reflected from said second lateral-view mirror to said rear-view mirror to said driver.

8. The assembly of claim 7 wherein said housing is removably coupled to said interior surface of said rear window.

9. The assembly of claim 1 further comprising a remote controlled system coupled to said vehicle and having:
   a remote control coupled to an interior portion of said vehicle proximate said driver's side of said vehicle; and
   at least one actuation device coupled to said housing and dimensioned to adjust said first lateral-view mirror and said second lateral-view mirror relative to said rear portion of said vehicle when said remote control transmits an actuation signal to said at least one actuation device.

10. The assembly of claim 9 wherein said remote controlled system being programmable with at least one preset position for at least one of said first lateral-view mirror and said second lateral-view mirror.

11. The assembly of claim 10 wherein said at least one preset position being set according to preferences of a particular driver.

12. The assembly of claim 10 wherein said at least one preset position being set according to a type of parking space.

13. A method for viewing objects positioned lateral to a rear portion of a vehicle comprising, in combination, the steps of:
   providing a housing having:
   a base;
   a first and a second bracket slidingly coupled to said base;
   a first mirror holder coupled to said first bracket; and
   a second mirror holder coupled to said second bracket;
   a first lateral-view mirror coupled to said first mirror holder, said first lateral-view mirror being positioned in a line of sight with a rear-view mirror of said vehicle, said first lateral-view mirror being dimensioned to allow a driver to view objects positioned lateral to a passenger's side of said rear portion of said vehicle by looking at a reflection of said objects reflected from said first lateral-view mirror to said rear-view mirror to said driver; and
   a second lateral-view mirror coupled to said second mirror holder, said second lateral-view mirror being positioned in a line of sight with said rear-view mirror of said vehicle, said second lateral-view mirror being dimensioned to allow said driver to view objects positioned lateral to a driver's side of said rear portion of said vehicle by looking at a reflection of said objects reflected from said second lateral-view mirror to said rear-view mirror to said driver;
   coupling said housing to a substantially center portion of an interior surface of a rear window of said vehicle; and
   said driver looking into said rear-view mirror so as to view objects positioned lateral to said rear portion of said vehicle.

14. The method of claim 13 further comprising the steps of:
providing a remote controlled system coupled to said vehicle, said remote controlled system having:
a remote control coupled to an interior portion of said vehicle proximate said driver's side of said vehicle; and
at least one actuation device coupled to said housing and dimensioned to adjust said first lateral-view mirror and said second lateral-view mirror relative to said rear portion of said vehicle when said remote control transmits an actuation signal to said at least one actuation device; and
adjusting at least one of said first lateral-view mirror and said second lateral-view mirror with said remote controlled system.

15. The method of claim 14 further comprising the step of programming said remote controlled system with settings according to preferences of at least one particular driver.

16. The method of claim 14 further comprising the step of programming said remote controlled system with settings according to at least one particular type of parking space.

17. The method of claim 16 wherein said parking space being one of an angled parking space, a straight parking space, and a parallel parking space.

* * * * *